United States Patent
Williams

(10) Patent No.: US 7,933,939 B2
(45) Date of Patent: Apr. 26, 2011

(54) APPARATUS AND METHOD FOR PARTITIONING DATA BLOCKS

(75) Inventor: Ross N. Williams, Adelaide (AU)

(73) Assignee: Quantum Corporation, San Jose, CA (US)

(*) Notice: Subject to any disclaimer, the term of this patent is extended or adjusted under 35 U.S.C. 154(b) by 397 days.

(21) Appl. No.: 12/104,348

(22) Filed: Apr. 16, 2008

(65) Prior Publication Data

US 2009/0265397 A1  Oct. 22, 2009

(51) Int. Cl.
*G06F 17/00* (2006.01)

(52) U.S. Cl. ........ 707/964; 707/809; 707/811; 707/968; 707/969

(58) Field of Classification Search .................. 707/809, 707/811, 964, 968, 969
See application file for complete search history.

(56) References Cited

U.S. PATENT DOCUMENTS

| 5,990,810 | A | 11/1999 | Williams |
| 2003/0004944 | A1 | 1/2003 | Harper et al. |
| 2008/0065964 | A1 | 3/2008 | Zarrinkoub et al. |
| 2009/0132760 | A1* | 5/2009 | Flynn et al. .................. 711/113 |

OTHER PUBLICATIONS

Tian, D. et al. "Hybrid Variable Length Coding in Video Compression using Variable Breakpoint" IEEE International Conference on Image Processing. IEEE, 2007, vol. 3.
Patent Cooperation Treaty (PCT) International Search Report from co-pending PCT International Application No. PCT/US2009/040307 (International Filing Date Apr. 13, 2009) having a date of mailing of Aug. 11, 2009.

\* cited by examiner

*Primary Examiner* — Sana Al-Hashemi

(57) ABSTRACT

A method and apparatus for increasing the speed at which a block of data can be partitioning into variable-length subblocks is provided. The method combines a relatively high-speed partitioning algorithm (that can only partition a block into relatively small mean-length subblocks) with a relatively low-speed algorithm (that can partition a block into subblocks of any mean length) to yield a relatively high-speed partitioning algorithm that can partition blocks into subblocks of any mean-length.

19 Claims, 5 Drawing Sheets

APPARATUS AND METHOD FOR PARTITIONING DATA BLOCKS

TECHNICAL FIELD

The present invention relates to a method and apparatus for data partitioning, and, more particularly, some embodiments relate to increasing the partitioning speed of data into variable-length subblocks.

DESCRIPTION OF THE RELATED ART

Today's advanced storage systems partition blocks of data into subblocks using a partitioning algorithm that yields the same subblocks when the same data appears in various contexts and alignments. Conventionally, a data partitioning algorithm has a target mean subblock length, which is the mean length of subblocks that the algorithm will generate when applied to white noise (random bytes) as the quantity of data goes to infinity. Each partitioning algorithm either has a fixed static target mean subblock length or specifiable target mean subblock length. For example, a particular partitioning algorithm might allow its user to specify a target mean subblock length of between 128 bytes and 512 bytes.

On some CPU architectures, it is possible to construct a high-speed data partitioning algorithm if the range of target mean subblock length is restricted. Consider the case for example, of a high speed partitioning algorithm (HSPA) that runs at 500 Megabytes (MB) per second by accepting a target mean subblock length in the range of 1 to 4095. A low speed partitioning algorithm (LSPA) that accepts a target mean subblock length in the range of 128 to $2^{32}-1$ typically runs at 256 MB/s. In this case, if we want to use a target mean subblock length greater than 4095, we have to use the low speed partitioning algorithm.

BRIEF SUMMARY OF EMBODIMENTS OF THE INVENTION

According to various embodiments of the invention, a method is provided to combine two or more data partitioning algorithms to provide the speed of the faster algorithm with the wider target mean subblock length range of the slower.

According to one embodiment of the present invention, a method for partitioning a data block comprises: determining a first boundary condition for the data block at a first data position using a first equation; determining a second boundary condition for the data block at the first data position using a second equation; and partitioning the data block by placing a subblock boundary at the first data position based on the first and second boundary conditions. The first equation of the method may use a first range of mean subblock length to determining the first boundary condition. The first range may have a range of 0 to 4095. The second equation may use a second range of mean subblock length to determining the second boundary condition. Additionally, the second range is larger than the first range.

In yet another embodiment, the first equation is represented by: HSPA(b1,b2,b3)=(((b1<<8) xor (b2<<4) xor b3)|p)=v, wherein HSPA is a Boolean function to test for boundary condition, wherein b1, b2, and b3 are bytes preceding the first data position, wherein << is left bit shift and >> is right bit shift, wherein p is a target mean subblock length having a range of 0 to 65535, and wherein v is a constant in the range [0,p−1]. P may have a range of 0to 4095.

In still another embodiment, the second equation is represented by: LSPA(c[−15..0])=((md5(c[−15..0])|$2^{32}$)|q)=w, wherein md5 is a cryptographic hash algorithm, c[15..0] comprises 16 bytes to the left of the first data position, q is a target mean subblock length having a range of 0 to $2^{32-1}$, and wherein w is a constant in the range [0,q−1].

In still another embodiment, the first and second equations may be executed concurrently. The first equation can be a high-speed data partitioning algorithm and the second equation can be a low-speed data partitioning algorithm. Additionally, the second equation can be executed based on a result from the first equation.

In yet another embodiment according to the present invention, a computer program product comprising a computer useable medium having computer readable program code functions embedded in the medium for partitioning a data block comprises: computer readable program code that causes the computer to determine a first boundary condition for the data block at a first data position using a first equation; computer readable program code that causes the computer to determine a second boundary condition for the data block at the first data position using a second equation; and computer readable program code that causes the computer to partition the data block by placing a subblock boundary at the first data position based on the first and second boundary conditions. The computer-readable program code can be configured to cause the computer to use a first range of mean subblock length to determine the first boundary condition. The computer readable program code can be configured to cause the computer to use a second range of mean subblock length to determine the second boundary condition. The first range may have a range of 0 to 4095, and the second range second range can be larger than the first range.

In yet another embodiment, the first equation is represented by: HSPA(b1,b2,b3)=(((b1<<8) xor (b2<<4) xor b3)|p)=v, wherein HSPA is a Boolean function to test for boundary condition, wherein b1, b2, and b3 are bytes preceding the first data position, wherein << is left bit shift and >> is right bit shift, wherein p is a target mean subblock length having a range of 0 to 65535, and wherein v is a constant in the range [0,p−1]. And the second equation is represented by: LSPA(c [−15..0])=((md5(c[−15..0])|$2^{32}$)|q)=w, wherein md5 is a cryptographic hash algorithm, c[15..0] comprises 16 bytes to the left of the first data position, q is a target mean subblock length having a range of 0 to $2^{32-1}$, and wherein w is a constant in the range [0,q−1].

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

According to various embodiments of the invention, a method is provided to combine two or more data partitioning algorithms to provide the speed of the faster algorithm with the wider target mean subblock length range of the slower algorithm. Because a computer generally has limited processing capabilities, an algorithm that yields a wider target mean subblock length range will generally operate slower than that of an algorithm that generates a narrower target mean subblock length range. The speed of the algorithm are relative to each other.

Figure 1:
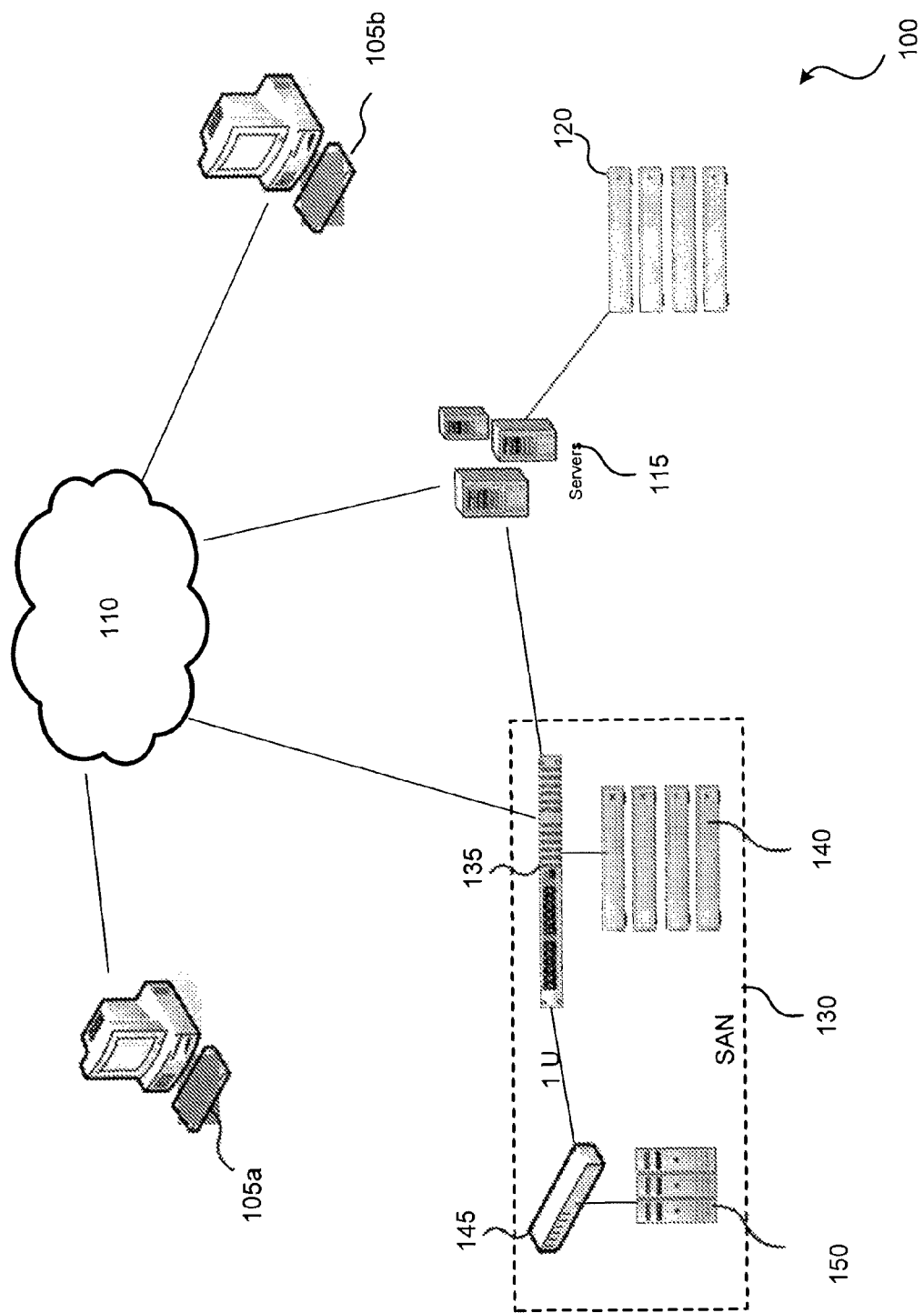
FIG. 1 illustrates an example environment in which the present invention can be implemented according to one embodiment of the present invention.

Before describing the invention in detail, it is useful to describe an example environment with which the invention can be implemented. FIG. 1 illustrates a system 100 with which the present invention can be implemented. System 100 in the illustrated example includes computing devices 105*a-b*, a network 110, a server 115, an array of storage disks 120, and a storage area network 130. Computing devices 105*a-b* can be any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. As shown, computing devices 105*a-b* and server 115 are connected to network 110. The connection to network 110 can be wireless or through a wired connection.

Server 115 can be any server system such as, for example, a conventional standalone file server configured to provide data services to a client device such as device 105*a*. Server 115 can be scalable to increase storage capacity such as, for example, by adding storage disk array 120. Disk array 120 can be implemented as, for example, a direct-attached storage (DAS system). In the example architecture illustrated in FIG. 1, system 100 includes SAN 130, which includes switch 135, disk array 140, router 145, and a tape server 150. Server 115, disk array 120, and SAN 130 can be implemented using one or more types of storage architectures such as, for example, small computer system interface (SCSI), serial advanced technology attachment (SATA), serial attached SCSI (SAS), or fiber channel (FC).

A legacy SCSI system with an 8-bit wide bus can typically deliver data at a rate of approximately 40 megabytes per second (MBps), whereas contemporary 16-bit wide bus SCSI systems can deliver data up to 320 MBps. Typical SATA systems are generally less expensive than an equivalent SCSI system and can provide performance close to that of the 16-bit wide bus SCSI system at 300 MBps.

FC systems are common and more widely used than SATA and SCSI systems. FC systems offer several advantages such as pooled resources, flexible backup capability, scalability, fast data transfer (up to 800 MBps full-duplex 4 Gbit link), and the ability to accommodate long cable lengths. FC systems may have cable lengths up to 10 kilometers as compared to a maximum cable length of 25 meters for other system such as, for example, a SCSI system.

With continued reference to FIG. 1, the illustrated exemplary system 100 can provide data access and storage redundancy by storing data at multiple locations such as server 115, disk arrays 120 and 140, or tape server 150. Server 115 can be groups of remote servers, each group may be locally or remotely connected with other groups via a network similar to network 110. As shown in FIG. 1, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In system 100, vast amounts of electronic information are stored, communicated, and manipulated between various devices such as between computer 105*a* and disk array 140 or between computer 105*a* and server 115. Generally, data are transmitted between these devices in packets or blocks of data. Much of the information in these data packets/blocks may be duplicate or substantially similar with one another. For example, duplicate or substantially similar copies of data may be stored on disk array 140, communicated across network 110, or processed using computer 105*a*. One of the ways to increase the efficiency of system 100 is to reduce the amount of duplicate data being sent by system 100. In one embodiment, to simplify the detection of duplicate data among blocks of a data stream, a partitioning algorithm is used to partition blocks of data into subblocks, which are then compared with other subblocks.

From time to time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Data blocks in system 100 are partitioned into subblocks with a target mean subblock length of T (for "target"). In one embodiment, data can be partitioned using two types of partitioning algorithms: high-speed partitioning algorithm, and low-speed partitioning algorithm. As compared to a low-speed partitioning algorithm, a high-speed partitioning algorithm typically uses narrow-width arithmetic and modulo arithmetic. This places a limitation on the useable range of target mean subblock lengths that can be implemented by a high-speed partitioning algorithm.

Consider a case where a partitioning algorithm accepts a sequence of bytes to the left of a potential boundary position and uses some calculation such as, for example, a hash algorithm or an XOR combination algorithm to generate a 16-bit number in the range from 0 to 65535. Generating a number that falls within a range that is a power of two is a typical first step in these kinds of algorithms. In this way, the algorithm may combine the bytes into a smaller, more manageably narrow value, thus making calculations more manageable and calculable using common registers.

In one embodiment, once a value 'v' in a power-of-two range 0 to 2x−1 ("$[0,2^x-1]$") has been generated, it can be converted to a Boolean with a 1/T chance. One way to do this is to calculate 'v' mod T and compare it to an arbitrarily chosen fixed constant in the range 0 to T−1 ("[0,T−1]") (e.g. 1). This works by repeatedly "wrapping" the space $[0,2^x-1]$ into the space [0,T−1] and will work accurately if $2^x$ is an integer multiple of T. However, if $2^x$ is not an integer multiple of T, there will be a leftover space at the end of the range [0, $2^x-1$] that will warp the mapping.

Figure 2:
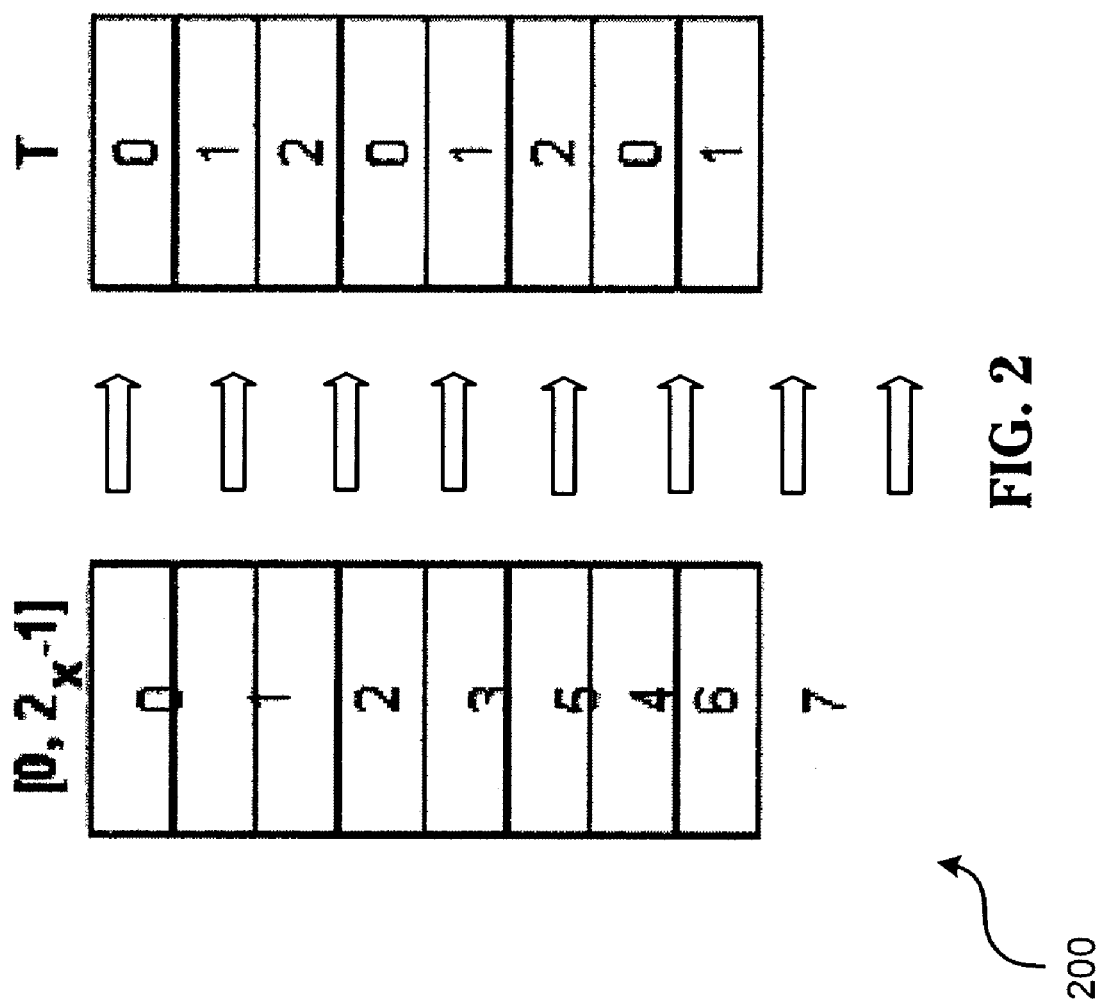
FIG. 2 illustrates an example partitioning map table according to one embodiment of the present invention.

FIG. 2 shows a table 200 that illustrates how components of the [0, 2X, $2^x-1$] space are mapped to the [0,T−1] space according to one embodiment of the present invention. Referring now to FIG. 2, table 200 shows the space mapping for a scenario where $2^x=8$ and T=3. As shown in table 200, both spaces '0' and '1' of the [0,T−1] space are each being mapped to a [0, $2^x-1$] space three out of eight times. The space '2' of the [0,T−1] space is mapped to a [0, $2^x-1$] space two out of eight times. In other words, the distribution probability is: 0=>3/8; 1=>3/8; and 2=>2/8. Because the distribution probability is not uniform (e.g., 3/8, 3/8, 3/8), the distribution of table 200 is distorted.

This distribution distortion is insignificant if $2^x$ is much larger than T, but becomes significant as T approaches $2^x$. If X=16, for 16-bit arithmetic, the error will not be more than about 1/16th ($4096/65536$) for T<4096. Thus, it is possible to keep the error below about 7% (an arbitrarily chosen figure) by choosing a T that is less than 4096 in constraint functions that employ a 16-bit first phase. As such, a constraint function might have a constrained range of 0 to 4095 for its target mean subblock length.

Consider the example of a high-speed partition algorithm that has a 16-bit first stage and therefore allows a target mean subblock length to be selected from the range of 0 to 65535. With the range of 0 to 65535, the distribution distortion increases as 'p' approaches 65535. Let us assume 'p' to be 60000. In this case, values that fall in the range 60000 to 65535 will be mapped into the range 0 to 5535 effectively doubling the weight of that range and distorting the resultant mean subblock lengths away from 'p'. This can be overcome by choosing values for 'p' that are significantly lower than 65535. Restricting the range of choice of p to 0 to 4095 will mean that the resulting actual mean subblock length will be likely to approximate 'p' to an accuracy of about one part in 16 (65536/4096) (~7%).

Figure 3:
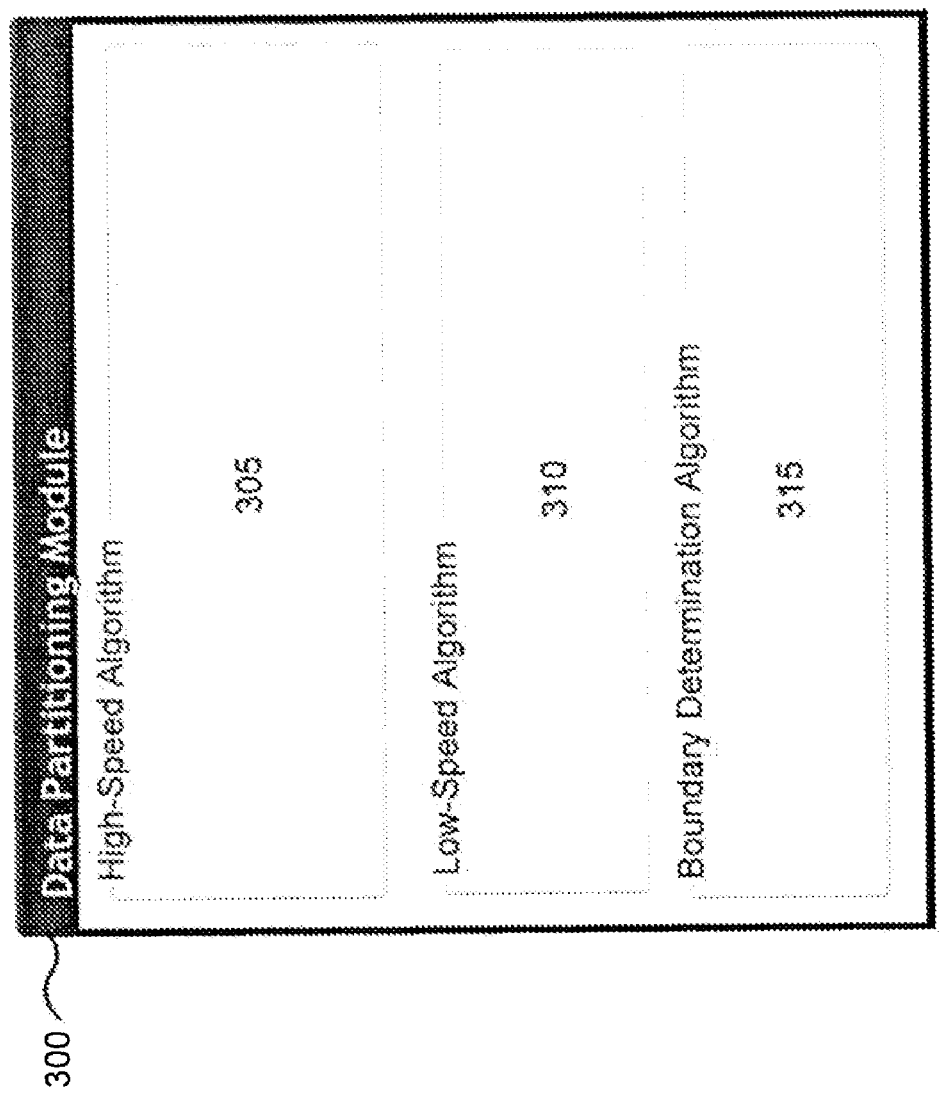
FIG. 3 illustrates a data partition module in accordance with one embodiment of the present invention.

FIG. 3 illustrates a data partitioning module 300 according to one embodiment of the present invention. Referring now to FIG. 3, data partitioning module 300 includes a high-speed data partitioning algorithm 305, a low-speed data partitioning algorithm 310, and a boundary determination algorithm 315.

In one embodiment, high-speed data partitioning algorithm 305 is represented by the following equation:

$$\text{HSPA}(b1,b2,b3)=(((b<<8) \text{ xor } (b2<<4) \text{ xor } b3)|p)=v \quad (1)$$

where HSPA is a boolean function to test for a boundary condition. In Eqn. 1, "b1", "b2", and "b3" are the bytes preceding potential boundary positions, "<<" is a left bit shift, ">>" is a right bit shift. Also, "|" is the modulo operation, "p" is a positive integer in the range 0 to 65535 being the target mean subblock length for high-speed partitioning algorithm, and "v" is a constant in the range 0 to p−1 ("[0,p−1]"). In one embodiment, all operations are conducted on 32-bit unsigned integers.

In one embodiment, low-speed data partitioning algorithm 310 is represented by the following Eqn.:

$$\text{LSPA}(c[-15..0])=((md5(c[-15..0])|2^{32})|q)=w \quad (2)$$

where "md5( )" is the MD5 cryptographic hash algorithm. In Eqn. 2, "c[−15..0]" denotes the 16 bytes to the left of the potential boundary, "q" is a positive integer in the range 0 to $2^{32}-1$ being the target mean subblock length for low-speed partitioning algorithm, and "w" is a constant in the range [0,q−1].

As previously mentioned, in a data partitioning process, it is preferable to keep the distribution distortion or error approximately below 1/16. In practice, in a 16-bit algorithm this restricts the values of p to a range of 0 to 4095.

For example, let us assume that the goal of module 300 is to partition blocks of data into subblocks with a target mean subblock length of T=46288. In one embodiment, module 300 finds any pair of numbers J and K such that T=J×K and J is in the range [X,Y] (this may be an arbitrary range). J is the target mean subblock length for the high-speed partition algorithm, and K is the target mean subblock length for the low-speed partition algorithm. However, in algorithm 310, K is applied to the subblock boundaries yielded by high-speed partition algorithm 305. To arrive at the desired boundaries, in one embodiment, all boundaries that do not satisfy both the high-speed partitioning algorithm (J) and the low-speed partitioning algorithm (K) are discarded. The surviving boundaries define the subblocks for the combined algorithm.

Below is an example of how a block might be partitioned by module 300. Consider the following block of bytes: $b_1$ $b_2$ $b_3$ $b_4$ $b_5$ $b_6$ $b_7$ $b_8$ $b_9$. In this example, a hash function such as Eqn. 1 may be used to partition the block. Boundaries will be represented by pairs such as $b_6|b_7$. Assume that Eqn. 1 returns a Boolean value based on its argument and that a boundary is to be placed at each $b_i|bi+1$ for which Eqn. 1 is true with the following inputs ($b_{i-2}$, $b_{i-1}$, $b_i$).

As the hash function accepts 3-byte arguments, we start at $b_3|b_4$ and evaluate $H(b_1, b_2, b_3)$. For illustrative purposes, let us assume this turns out to be false. Thus, the next boundary is moved to $b_4|b_5$ and $H(b_2, b_3, b_4)$ is evaluated. If this is true, a boundary is placed at $b_4|b_5$. Next, we move to $b_5|b_6$ and evaluate $H(b_3, b_4, b_5)$. If this false, Eqn. 1 moves to the next boundary condition. If the Boolean value at $H(b_4, b_5, b_6)$ is true, a boundary is placed at $b_6|b_7$. This process continues until the end of the block is reached. Thus, for the example above, the data partition is as follows: b, $b_2$ $b_3$ $b_4|b_5$ $b_6|b_7$ $b_8$ $b_9$.

In module 300, either algorithm 305 or algorithm 310 can be used to first partition a block into subblocks. Whichever algorithm that was not used to partition the data block is then used to test for subblock boundaries. For example, in one embodiment, algorithm 305 is used first to partition a data block into subblocks, then algorithm 310 is used to determine the boundary of each subblock generated by algorithm 305. Alternatively, algorithm 310 is used first to partition a data block into subblocks, then algorithm 305 is used to determine boundary of each subblock generated by algorithm 310.

In one embodiment, algorithm 305 and algorithm 310 are not run sequentially, but are interleaved. For example, in one embodiment, high-speed partitioning algorithm 305 is used to find subblock boundaries, with low-speed partitioning algorithm 310 being invoked whenever algorithm 305 finds a boundary. In this way, algorithm 310 is used to determine whether the boundary found should be discarded or recorded as a subblock boundary of the combined algorithm.

In one embodiment, module 300 combines high-speed algorithm 305 and low-speed algorithm 310 to find subblock boundaries as follows:

```
for (i=0; i<length(block); i++)
    if (HSPA(position i)
        if (LSPA(position i))
            declare a subblock boundary at position i;
        endif
    endif
endfor
```

In module 300, high-speed data partitioning algorithm 305 can be configured to run faster if it looks only for a boundary rather than testing each boundary individually. Thus, in one embodiment, module 300 combines high-speed algorithm 305 and low-speed algorithm 310 to find subblock boundaries as follows:

```
i=0;
while (i<length(block))
    while ((i<length(block)) and not HSPA(block,i)) i++; endwhile
    if (LSPA(block,i)) declare a boundary at i;
endwhile
```

The inner tight loop can be unrolled and otherwise optimized for maximum speed without reference to the low-speed partitioning algorithm function.

In one embodiment, module 300 is configured to inspect the eight bytes that precede a position "p" within a block. Thus, module 300 will be inspecting seven of the same bytes to evaluate position p+1 or p−1. Here, module 300 may use either algorithm 305 or algorithm 310 to inspect the eight preceding bytes. Additionally, module 300 may run faster if a sequence of contiguous boundaries is evaluated in sequential order. For example, an algorithm that, as a first stage, reduces the bytes block [p−8..p−1] to a 32-bit register such that new bytes (at the p end) can be "added" to the register and old bytes (at the p−8 end) can be "subtracted" from the register. In this way, a total of two operations are performed per evaluation rather than eight operations.

In one embodiment, module 300 can be configured to find the subblock boundaries within a block that has already been evaluated rather than in a block with no previous evaluation. In this way, module 300 may operate faster than if it is applied in a "memoryless" fashion (i.e. with no knowledge of its previous evaluations) to each subblock boundary in turn.

In one embodiment, an unrolling of the tight loop is implemented by data partitioning module 300. To illustrate, let's assume that the target mean subblock length of the high-speed partitioning algorithm is 3025 bytes. In this illustration, module 300 will only have to pause and run the LSP algorithm 310 on average every 3025 bytes. LSP algorithm 310 may examine the candidate boundary "cold" because it has not been asked to evaluate nearby boundaries. However, because LSP algorithm 310 will be invoked on average only every 3025 bytes, this inefficiency will have a negligible impact on performance. Thus, in this embodiment, the combined partitioning algorithm will primarily use HSP algorithm 305.

In one embodiment, low-speed algorithm 310 can be optimized by allowing it to access the registers of high-speed algorithm 305. For example, if both the because LSP algorithm 310 and HSP algorithm 305 operate over a 8-byte window, then this window is likely to have been loaded into CPU registers (or CPU cache) by HSP algorithm 305 at the point when the LSP algorithm 310 is invoked, which would remove the need for LSP algorithm 305 to load the window from memory. Alternatively, LSP algorithm 305 and HSP algorithm 310 share the same first-stage calculation (and differ only in modulo), in which case that first-stage calculation can also be avoided by LSP algorithm 305.

In one embodiment, HSP algorithm 305 can be configured not to pause to run LSP algorithm 310 after finding a subblock. In this way, algorithms 305 and 310 are run in parallel. In one embodiment, each algorithm may be run on a separate CPU.

Although data partitioning module 300 has been described as using two constraints C1 and C2, two or more constraints could be employed so that constraint C=C1 and C2 and . . . and Cn. C1 would be evaluated repeatedly for each position in the block, and C2 evaluated only at positions where C1 succeeds. Similarly, C3 would be evaluated only at positions where both C1 and C2 have succeeded, and so on.

In one embodiment, if a low-speed partitioning algorithm 310 uses a 16-bit hash and modulo structure, it will be able to approximate most target mean subblock lengths in its available range of target mean subblock lengths. There will, however, be a subset of target mean subblock lengths that will provide exact accuracy. In this scenario, a low error is obtained for parameter values that are roughly divisible into 65536. For example, a target mean subblock length of 21845 can be implemented by a partitioning algorithm with a 16-bit first stage and no second stage. The 21845 value is derived from $3 \times 21845 \sim = 65536$. In general, target mean subblock lengths T that satisfy $nT \sim = 65536$ for natural n will provide good accuracy.

While the operation of high-speed partitioning algorithm 305 may be constrained by the optimizations required to make it fast, low-speed partitioning algorithm 310 is not so constrained. For example, an implementation of a two-algorithm partitioning algorithm, such as module 300, with a target mean subblock length of 27000 can be created by selecting a high-speed partitioning algorithm with a T=4681 (65536/14) and a low-speed partitioning algorithm with a T=27000/4681=5.767. This would provide the speed of the high-speed partitioning algorithm without having to suffer its inherent inaccuracy.

A low-speed partitioning algorithm with a T value that is not an integer can be obtained by (e.g., T=5.767) by setting low-speed partitioning algorithm 305 first stage to generate a value in the range of $0-2^{32-1}$, and then declaring a boundary if the value falls within the subrange of $[0,(2^{32})/T]$. This can be accurate because the low-speed partitioning algorithm is typically required to perform with low T values (e.g. 0 to 100) rather than the relatively high T values required of high-speed partitioning. Additionally, low-speed partitioning algorithm 310 has the time to perform relatively expensive operations such as operating on 32-bit or 64-bit values rather than on 16-bit values.

Because we have two free variables J and K that must satisfy J×K=T, we are free to choose an integer J that allows the high-speed partitioning algorithm to provide accuracy, and then choose a non-integer K that can be implemented by a slower low-speed partitioning algorithm, thereby achieving the best of both worlds.

A case could arise in a two-algorithm (high-speed partitioning algorithm and low-speed partitioning algorithm) partitioning algorithm in which high-speed partitioning algorithm 305 repeatedly succeeds (finds boundaries) and low-speed partitioning algorithm repeatedly fails 310. In this case, it might actually be more efficient to swap the evaluation order. An adaptive algorithm could keep track of the ratio of high-speed partitioning algorithm and low-speed partitioning algorithm successes and swap accordingly.

Figure 4:
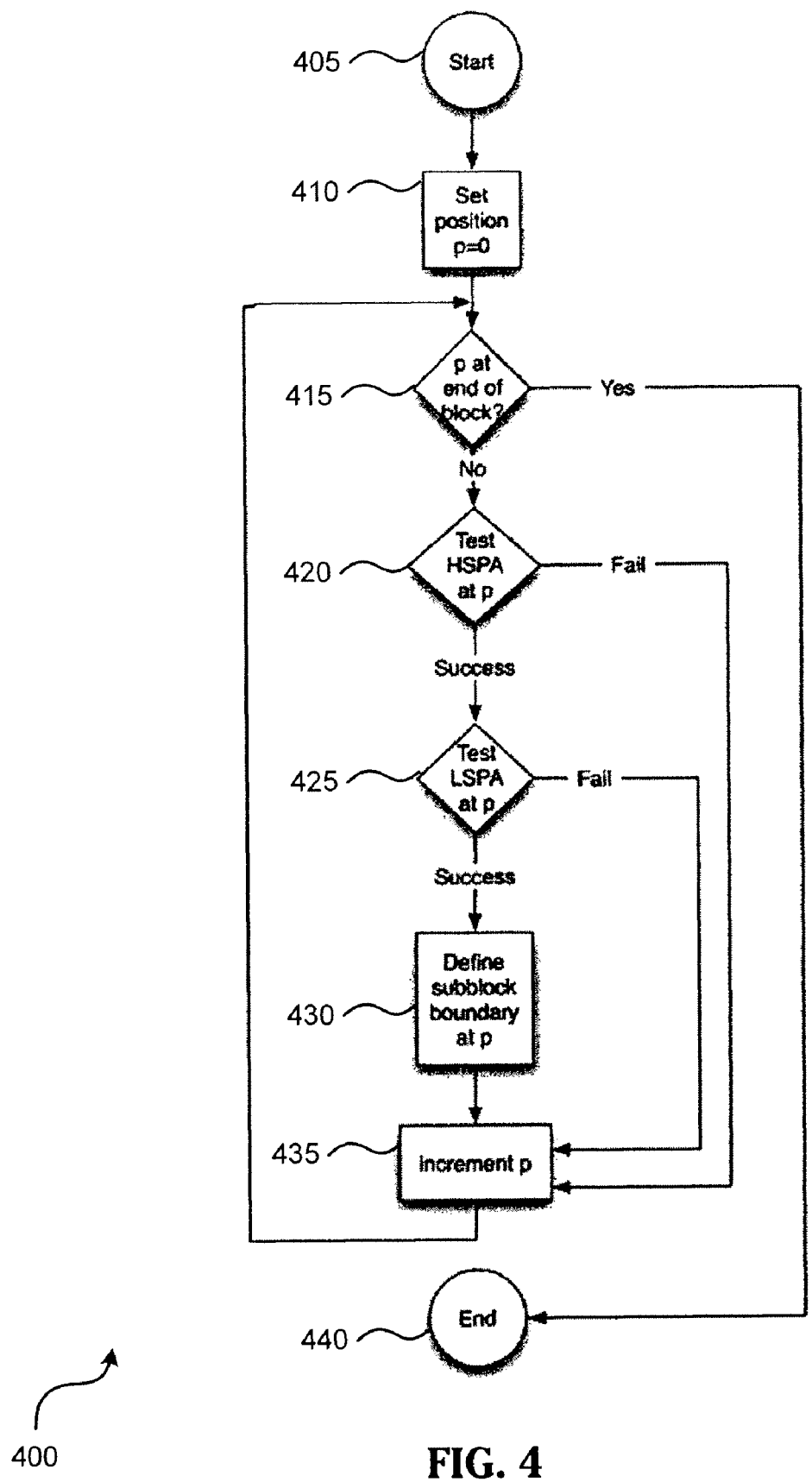
FIG. 4 illustrates an example flow diagram of a data partitioning method according to one embodiment of the present invention.

FIG. 4 illustrates a data partitioning process 400 implemented according to one embodiment of the present invention. Referring now to FIG. 4, process 400 starts at a step 405.

In a step 410, module 300 executes algorithm 305 or 310 to set position p equal to zero. In a step 415, using either algorithm 305 or 310, module 300 determines whether a current position 'p' is at the end of a data block. If yes, process 400 ends at a step 440. Otherwise, process 400 continues at a step 420.

In step 420, the current position "p" is tested using high-speed partitioning algorithm 305 that includes Eqn. 1. If the test at step 420 fails, then process 400 continues at a step 435 where the current position "p" is incremented. However, if in step 420 the test yields a success result, then process 400 continues at a step 425 where the current position is tested using low-speed partitioning algorithm 310 that includes Eqn. 2. A success result in step 420 can be a result that yields a partition location at a particular offset. In this case, the offset is generated by the high speed partitioning algorithm.

If the test at step 425 fails, then process 400 continues at a step 435 where the current position 'p' is incremented. However, if the test step 425 is successful, process 400 continues at step 430 where a subblock boundary is defined at position 'p'. In one embodiment, step 430 is implemented using boundary algorithm 315, which uses the results of both Eqn. 1 at step 420 and Eqn. 2 at step 425 to determine whether a boundary should be placed at position 'p'. In step 430, a subblock boundary is defined at position 'p' only when the results of both tests at steps 420 and 425 are true.

Figure 5:
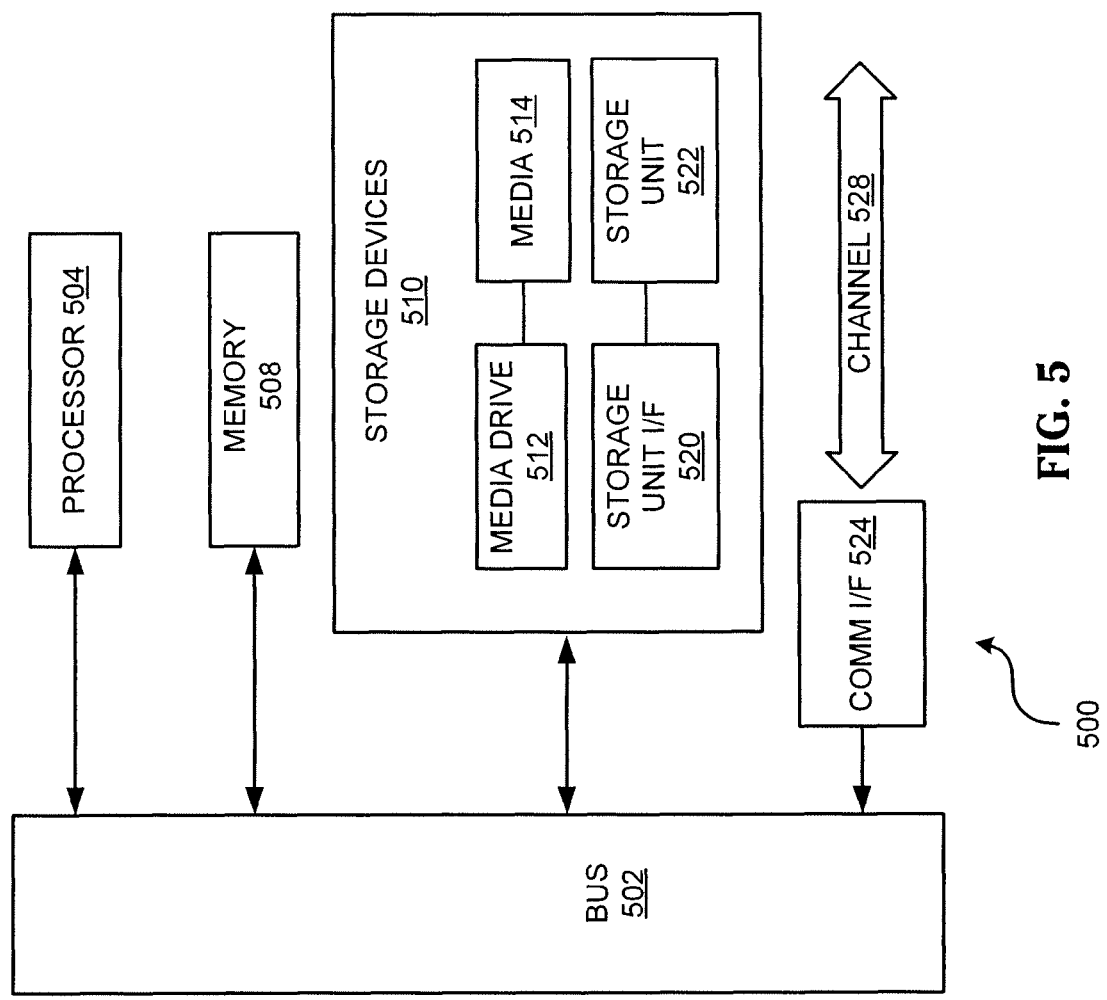
FIG. 5 illustrates an example computer system in which data partitioning module can be implemented according to one embodiment of the present invention.
Figure 2:
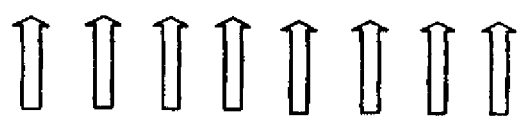

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

Where components or modules of the invention are implemented in whole or in part using software, in one embodiment, these software elements can be implemented to operate with a computing or processing module capable of carrying out the functionality described with respect thereto. One such example-computing module is shown in FIG. 5. Various embodiments are described in terms of this example-computing module 500. After reading this description, it will become apparent to a person skilled in the relevant art how to implement the invention using other computing modules or architectures.

Referring now to FIG. 5, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, and other electronic devices that might include some form of processing capability.

Computing module 500 might include, for example, one or more processors or processing devices, such as a processor 504. Processor 504 might be implemented using a general-purpose or special-purpose processing engine such as, for example, a microprocessor, controller, or other control logic. In the example illustrated in FIG. 5, processor 504 is connected to a bus 502 or other communication medium to facilitate interaction with other components of computing module 500.

Computing module 500 might also include one or more memory modules, referred to as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive. Accordingly, storage media 514, might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein particular computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, 802.XX or other interface), a communications port (such as for example, a USB port, IR port, RS232 port Bluetooth interface, or other port), or other communications interface. Software and data transferred via communications interface 524 might typically be carried on signals, which can be electronic, electromagnetic, optical or other signals capable of being exchanged by a given communications interface 524. These signals might be provided to communications interface 524 via a channel 528. This channel 528 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and signals on channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for partitioning a data block, comprising:
   determining a first boundary condition for the data block at a first data position using a first algorithm;
   determining whether a boundary is needed based on a result of the first algorithm; and
   determining the boundary location using a second algorithm if the first algorithm result indicates the boundary is needed,
   where the first algorithm is a high-speed data partitioning algorithm and the second algorithm is a low-speed data partitioning algorithm.

2. The method of claim 1, where the first algorithm uses a first range of mean subblock length to determine the first boundary condition.

3. The method of claim 2, where the second algorithm uses a second range of mean subblock length to determine the second boundary condition.

4. The method of claim 2, where the first range comprises a range of 0 to 4095.

5. The method of claim 1, where the second range is larger than the first range.

6. The method of claim 1, where the first algorithm is represented by: $\text{HSPA}(b1,b2,b3) = (((b1<<8) \text{ xor } (b2<<4) \text{ xor } b3)|p) == v$, where HSPA is a Boolean function to test for boundary condition, where b1, b2, and b3 are bytes preceding the first data position, where $<<$ is left bit shift and $>>$ is right bit shift, where p is a target mean subblock length having a range of 0 to 65535, and where v is a constant in the range $[0, p-1]$.

7. The method of claim 6, where p has a range of 0 to 4095.

8. The method of claim 6, where the second algorithm is represented by: $\text{LSPA}(c[-15..0]) = ((\text{md5}(c[-15..0])|2^{32})|q)$ =w, where md5 is a cryptographic hash algorithm, c[15..0] comprises 16 bytes to the left of the first data position, q is a target mean subblock length having a range of $0\text{-}2^{32-1}$, and where w is a constant in the range [0,q−1].

9. The method of claim 1, where the first and second algorithms are executed concurrently.

10. The method of claim 1, where the second algorithm is executed based on a result from the first algorithm.

11. A computer program product comprising a computer useable medium having computer readable program code functions embedded in the medium for partitioning a data block comprising:
  computer readable program code that causes the computer to determine a first boundary condition for the data block at a first data position using a first algorithm;
  computer readable program code that causes the computer to determine whether a boundary is needed based on a result of the first algorithm; and
  computer readable program code that causes the computer to determine the boundary location using a second algorithm if the first algorithm indicates the boundary is needed, where the first algorithm is a high-speed data partitioning algorithm and the second algorithm is a low-speed data partitioning algorithm.

12. The computer program product of claim 11, comprising a computer readable program code that causes the computer to use a first range of mean subblock length to determining the first boundary condition.

13. The computer program product of claim 11, comprising a computer readable program code that causes the computer to use a second range of mean subblock length to determine the second boundary condition.

14. The computer program product of claim 12, where the first range comprises a range of 0 to 4095.

15. The computer program product of claim 14, where the second range is larger than the first range.

16. The computer program product of claim 11, where the first algorithm is represented by: $\text{HSPA}(b1,b2,b3)=(((b1<<8)\ \text{xor}\ (b2<<4)\ \text{xor}\ b3)|p)==v$, where HSPA is a Boolean function to test for boundary condition, where b1, b2, and b3 are bytes preceding the first data position, where << is left bit shift and >> is right bit shift, where p is a target mean subblock length having a range of 0 to 65535, and where v is a constant in the range [0,p−1].

17. The computer program product of claim 11, where the second algorithm is represented by: $\text{LSPA}(c[-15.0])=((\text{md5}(c[-15.0])|2^{32})|q)=w$, where md5 is a cryptographic hash algorithm, c[15.0] comprises 16 bytes to the left of the first data position, q is a target mean subblock length having a range of $0\text{-}2^{32-1}$, and where w is a constant in the range [0,q−1].

18. The computer program product of claim 11, where the first and second algorithms are executed concurrently.

19. The computer program product of claim 11, where the second algorithm is executed based on a result from the first algorithm.

* * * * *

UNITED STATES PATENT AND TRADEMARK OFFICE
CERTIFICATE OF CORRECTION

PATENT NO. : 7,933,939 B2  
APPLICATION NO. : 12/104348  
DATED : April 26, 2011  
INVENTOR(S) : Ross N. Williams Page 1 of 2

It is certified that error appears in the above-identified patent and that said Letters Patent is hereby corrected as shown below:

Abstract:
In abstract, line 2, delete "partitioning" and insert --partitioned--.

The sheet of drawings consisting of figure 2 should be deleted to appear as per attached figure 2.

In column 1, line 53, delete "determining" and insert --determine--.

In column 1, line 55, delete "determining" and insert --determine--.

In column 3, lines 26-27, delete "than that of" and insert --than--.

In column 3, line 28, delete "algorithm" and insert --algorithms--.

In column 5, line 2, delete "2x-1" and insert --$2^x-1$--.

In column 5, line 12, delete "[0, 2X, $2^x-1$]" and insert --[0, $2^x-1$]--.

In column 7, line 61, delete "because".

Signed and Sealed this  
Fifth Day of July, 2011

David J. Kappos  
*Director of the United States Patent and Trademark Office*